US009003659B1

(12) United States Patent
Sardo

(10) Patent No.: US 9,003,659 B1
(45) Date of Patent: Apr. 14, 2015

(54) METHOD OF RETROFITTING A HARMONICA

(71) Applicant: Philip Sardo, Sherman Oaks, CA (US)

(72) Inventor: Philip Sardo, Sherman Oaks, CA (US)

( * ) Notice: Subject to any disclaimer, the term of this patent is extended or adjusted under 35 U.S.C. 154(b) by 0 days.

(21) Appl. No.: 14/476,890

(22) Filed: Sep. 4, 2014

Related U.S. Application Data

(63) Continuation-in-part of application No. 14/058,727, filed on Oct. 21, 2013, now Pat. No. 8,847,050.

(51) Int. Cl.
*G10D 7/12* (2006.01)
*B29D 17/00* (2006.01)
*G10D 7/00* (2006.01)

(52) U.S. Cl.
CPC ................ *G10D 7/005* (2013.01); *G10D 7/123* (2013.01)

(58) Field of Classification Search
CPC ............................... G10D 7/005; G10D 7/123
USPC ................. 29/896.22, 896.23, 401.1, 525.01, 29/525.02, 525.06, 525.07, 525.11; 84/377, 378, 379
See application file for complete search history.

(56) References Cited

U.S. PATENT DOCUMENTS

| | | | | |
|---|---|---|---|---|
| 87,241 | A | 2/1869 | Burdett | |
| 158,164 | A | 12/1874 | Burdett | |
| 173,652 | A | 2/1876 | Lightsinger | |
| 592,850 | A | 11/1897 | Weiss | |
| 653,451 | A | 7/1900 | Hohner | |
| 2,511,302 | A | 6/1950 | Stephenson | |
| 2,595,316 | A | 5/1952 | Wetzler | |
| 2,608,898 | A | 9/1952 | La Paglia | |
| 2,641,950 | A | 6/1953 | West et al. | |
| 2,726,568 | A | 12/1955 | Lake | |
| 2,280,390 | A | 1/1958 | Vento | |
| 2,877,679 | A | 3/1959 | Torahachi | |
| 3,674,910 | A * | 7/1972 | McKenzie | 84/377 |
| 4,342,250 | A * | 8/1982 | Robjent | 84/377 |
| 5,739,446 | A * | 4/1998 | Bahnson | 84/377 |
| 6,143,968 | A | 11/2000 | Tonon | |
| 6,175,067 | B1 | 1/2001 | Lambert | |
| 6,326,532 | B1 | 12/2001 | Antaki | |

(Continued)

FOREIGN PATENT DOCUMENTS

| | | |
|---|---|---|
| WO | WO0143116 | 6/2001 |
| WO | WO0157844 | 8/2001 |

(Continued)

OTHER PUBLICATIONS http://www.rockinronsmusic4less.com/content/harps/accessories/reedplates.php, Oct. 10, 2013.

*Primary Examiner* — Sarang Afzali
(74) *Attorney, Agent, or Firm* — Goldstein Law Offices, P.C.

(57) ABSTRACT

A harmonica with a tube plate that provides production of sweeter, clearer notes with a minimum of skill. The tube plate has a plurality of tubes and sits over the reeds and the comb under the cover plate, a tube coupled with each air chamber in the comb. The tubes form tunnels with the air chambers, enhancing reverberation and separating the sound waves emanating from the reed in each chamber. The tube plate can be added to a conventional harmonica. The harmonica has a plurality of reed units, each reed in a separate unit. Each reed unit is individually replaced when a reed requires replacement or when modification of the harmonica key is desired. The reed units can replace a reed plate in a conventional harmonica.

5 Claims, 12 Drawing Sheets

(56) References Cited

U.S. PATENT DOCUMENTS

| | | | |
|---|---|---|---|
| 6,518,489 | B2 | 2/2003 | Epping |
| 6,635,814 | B2 | 10/2003 | Antaki |
| 7,122,729 | B2 | 10/2006 | Lin |
| 7,989,687 | B2 | 8/2011 | Bibollet |
| 8,217,247 | B2 | 7/2012 | Horsley |
| 8,847,050 | B1 | 9/2014 | Sardo |
| 2013/0036893 | A1 | 2/2013 | Schaman |
| 2013/0036894 | A1 | 2/2013 | Bibollet |

FOREIGN PATENT DOCUMENTS

| | | |
|---|---|---|
| WO | WO0159753 | 8/2001 |
| WO | WO02084639 | 10/2002 |
| WO | WO2008087297 | 7/2008 |
| WO | WO2011131856 | 10/2011 |

* cited by examiner

METHOD OF RETROFITTING A HARMONICA

CROSS REFERENCES AND RELATED SUBJECT MATTER

This application is a continuation-in-part of patent application Ser. No. 14/058,727, filed in the U.S. Patent Office on Oct. 21, 2013, which is incorporated by reference herein.

TECHNICAL FIELD

The present disclosure relates generally to a harmonica. More particularly, the present disclosure relates to a modifiable harmonica and technology for retrofitting harmonica.

BACKGROUND

The harmonica is a free reed wind instrument used worldwide in nearly every musical genre. There are many types of harmonica, including diatonic, chromatic and tremolo to name a few. A harmonica is played by using the mouth to direct air into and out of a mouthpiece. Unlike other reed instruments, playing the harmonica requires both inhaling and exhaling strongly against resistance.

The harmonica has a plurality of holes along the mouthpiece, each hole having a chamber containing at least one reed which is pre-tuned to an individual pitch. The standard diatonic harmonica is designed to allow a player to play chords and melody in a single key. Because they are only designed to be played in a single key at a time, a player must purchase multiple diatonic harmonica to play in different keys. Some players prefer specially-tuned variants of the diatonic harmonic that is played in what is called a "cross-harp" style that allow the players to play a natural minor, harmonic minor and major scale.

Some players attempt to tune the harmonica itself by making small scratches or filings in one or more reeds. To raise the pitch of a reed, the scratch or file is at the top of the reed near the tip, which will make the reed vibrate faster and thus raise the pitch of the note. To lower the pitch of a reed, the scratch or file is at the top of the reed near the base, which makes the reed vibrate more slowly and thus lowers the pitch of the note. However, if a reed is damaged or is incorrectly modified and produces a pitch that is not desired, the entire reed plate must be replaced so many amateurs do not attempt tuning on their own.

While harmonica appear simple, it takes great skill and practice to play the harmonica well. Beginners are challenged to produce clear and clean notes. Sound waves from a reed in one air chamber cancels out sound waves from another reed, creating a muddy sound. The beginner must learn how to change pitch through embouchure adjustments and learn how to "bend", a technique unique to the harmonica.

A beginner often produces shrill, metallic sounds in the high register if they produce any sound at all. The beginner must learn how to gently produce these high notes through controlling breath, using lips, jaw, tongue, abdomen and most especially, the throat, to produce a sweet, clear note. Learning to play the harmonica well takes a great deal of practice to acquire the skill level to produce consistently beautiful notes.

While these techniques may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a harmonica that is easier for a beginner to play with a minimum technique ability. Accordingly, the present disclosure provides a tube plate coupled to a harmonica comb, the tube plate providing a plurality of tunnels for reverberation within the harmonica comb, producing clean, clear notes with a minimum of technique.

Another aspect of an example embodiment in the present disclosure is to provide a harmonica that produces a sweet sound in the high register. Accordingly, the present disclosure provides a harmonica having a plurality of tubes coupled to a plurality of air chambers of a harmonica comb, the tubes separating the sound waves produced in each chamber, thereby providing clear, sweet notes.

A further aspect of an example embodiment in the present disclosure is to provide a harmonica that is easy to maintain. Accordingly, the present disclosure provides a plurality of reed units, one reed in each unit, the unit replacing one reed at a time without replacing all the reeds simultaneously.

Accordingly, the present disclosure describes a harmonica with a tube plate that provides production of sweeter, clearer notes with a minimum of skill. The tube plate has a plurality of tubes and sits over the reeds and the comb under the cover plate, a tube coupled with each air chamber in the comb. The tubes form tunnels with the air chambers, enhancing reverberation and separating the sound waves emanating from the reed in each chamber. The tube plate can be added to a conventional harmonica, that is a harmonica known by those of ordinary skill as a traditional harmonica consisting of a comb with air chambers, a pair of reed plates and a pair of cover plates. The harmonica has a plurality of reed units, each reed in a separate unit. Each reed unit is individually replaced when a reed requires replacement or when modification of the harmonica key is desired. The reed units can replace a reed plate in a conventional harmonica.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
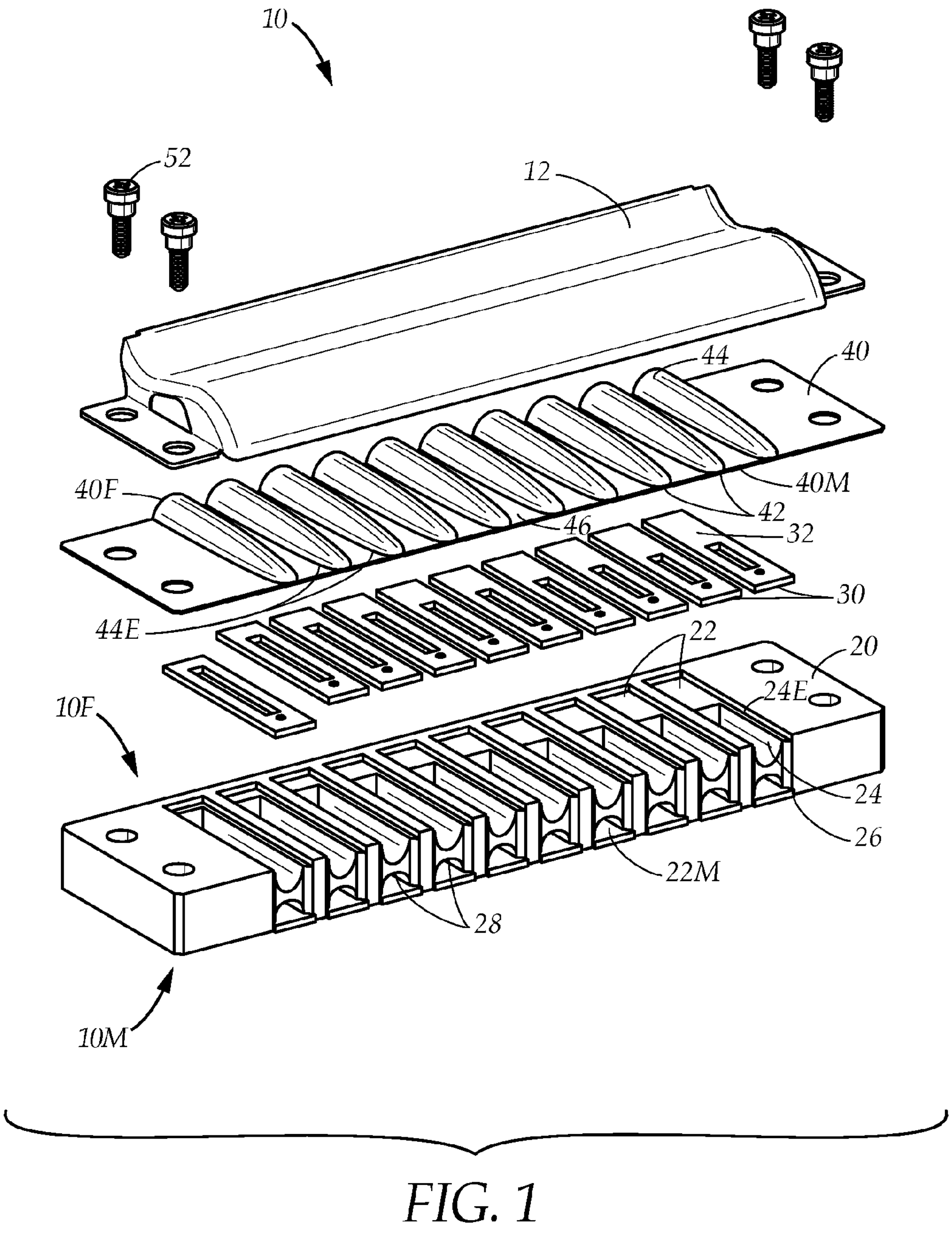
FIG. 1 is a partial exploded perspective view of an example embodiment of a harmonica of the present disclosure.

FIG. 1 illustrates an example embodiment of a plurality of novel components of a novel harmonica 10 of the present disclosure in a partially exploded view. Throughout this disclosure, the illustrations show a diatonic harmonica, but the concepts and embodiments disclosed can be adapted to other types of harmonica. The illustrations based on the diatonic harmonica should not be considered limitations except where stated.

The novel components that are coupled providing the novel harmonica 10 include a tube plate 40 having a plurality of tubes 42. The tube plate of the present disclosure can be added to a conventional harmonica in addition to being a component of the novel harmonica.

The novel components include a plurality of reed units 30. These reed units can replace a reed plate in the conventional harmonica in addition to being a component of the novel harmonica.

FIG. 1 shows a mouthpiece side 10M and an opposing front side 10F of the harmonica in the partial view. The harmonica has a pair of outer cover plates 12, a top cover plate shown in the partial view. The cover plates are orthogonal to and extend from the mouthpiece side 10M to the front side.

FIG. 1 shows a harmonica comb 20. The harmonica comb sits between the pair of cover plates 12 in the fully assembled harmonica. The comb has a mouthpiece side 10M and a front side 10F. The comb having a plurality of air chambers 22, each air chamber having an opening on the mouthpiece side 22M and an opening on the front side, which is not shown. Each air chamber 22 has a pair of side walls 24 extending between the mouthpiece side 10M and the front side 10F. Each side wall has an outside edge 24E, the outside edge having a notch 26.

The plurality of harmonica reed units 30 discontinuously attach to the harmonica comb, each reed having a planar plate section 32. When the reed is played and vibrates producing a note, only the planar plate section of the played reed vibrates. The plate sections of the other reed units not being played are unaffected and do not contribute to the sound of the note, thus producing a cleaner sound. The reed units make replacing damaged, worn-out or off-key reeds easier. Each reed in each unit can be replaced individually without replacing all the reeds simultaneously because each reed unit is discontinuous with all others. The reed units can replace a reed plate in a conventional harmonica as explained hereinbelow. Reed plates in the prior art can produce undesired sounds when the harmonica is played by a unskilled player, as one vibrating reed transfers vibrations to the entire plate, said transfer being absent when reed units of the present disclosure replace the plate.

In the drawing, the actual reeds in the reed units have been omitted for clarity. The reed unit is fully illustrated in FIG. 4A as explained hereinbelow.

Figure 4A:
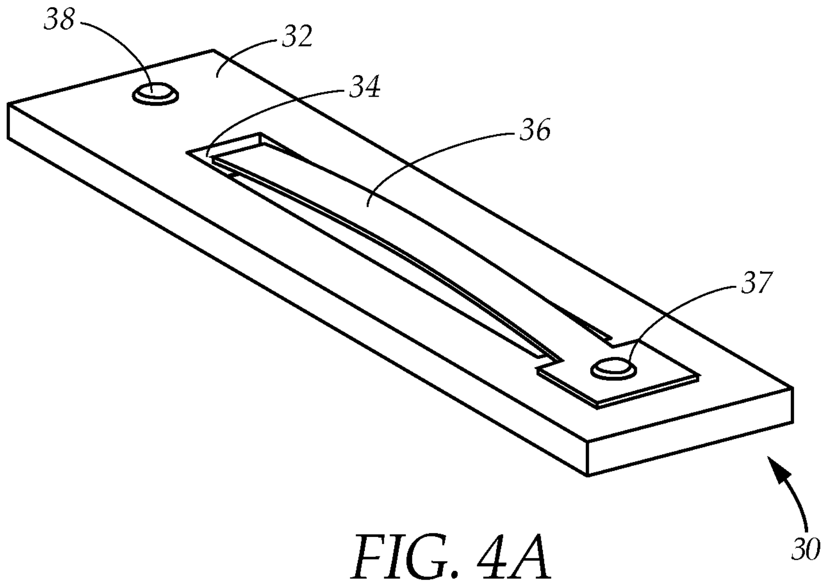
FIG. 4A is a perspective view of an example embodiment of a reed unit.
Figure 4B:
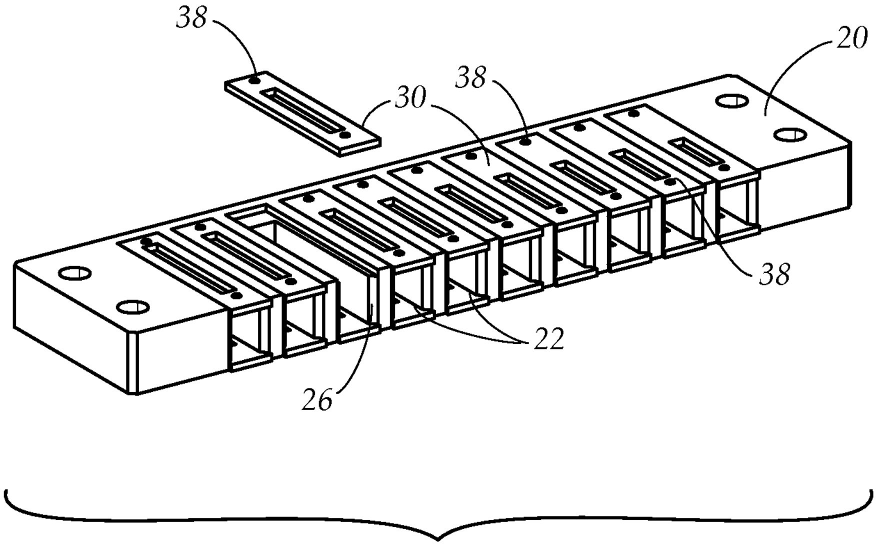
FIG. 4B is an exploded perspective view of an example embodiment of the comb with individual reed units.

As shown in FIG. 4A, each reed unit 30 has the planar plate section 32 with an airway slot 34. Each reed unit 30 has a reed 36, the reed secured over the slot 34 of the planar plate section 32 by a connector 37. Each reed unit has at least one fastener 38. The at least one fastener 38 is operative for attaching the harmonica reed unit to a single air chamber 22 of the harmonica comb 20 as shown in FIG. 4B. The harmonica reed unit 30 sits recessed within the comb 20 between the notches 26 of the side walls 24 of the air chamber 22, each harmonica reed unit discrete and separate, each harmonica reed vibrating discretely when played.

In FIG. 1, the harmonica 10 has the harmonica tube plate 40 inserting between the outer cover plate 12 and the comb 20, the tube plate 40 having a mouthpiece side 40M and a front side 40F. The tube plate 40 has a plurality of tapering tubes 42, each tapering tube having a continuous wall 44, the wall extending from a narrow mouthpiece side 40F to a wide arcuate front side opening 40F. The continuous wall has a pair of edges 44E extending from the mouthpiece side 40M to the front side 40F, the tube plate having a plate 46, the plate, a flat plane connecting the tapering tubes, the plate 46 attaching to the edges 44E of the walls of each tapering tube 42, thereby coupling the tubes to the plate. The mouthpiece sides 40M of the tubes align in parallel on the plate 46. Further, each edge 44E of the tapering tube aligns with the side wall 24 of the air chamber 22 such that each tapering tube is disposed on one of the air chambers when the harmonica 10 is assembled, the tube plate thereby modifying the harmonica and sounds the harmonica produces.

Figure 6A:
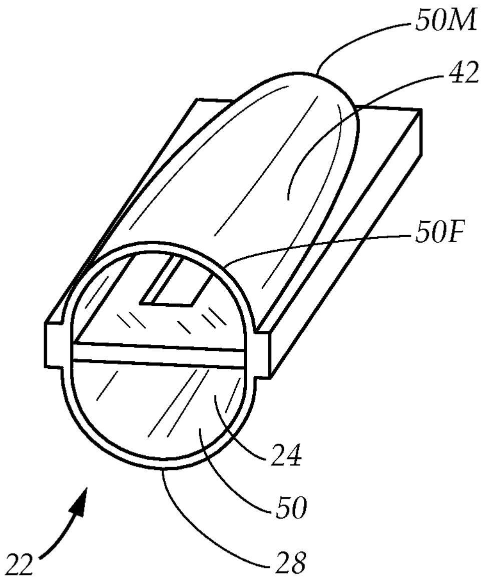
FIG. 6A is a partial view of an air chamber coupled to a tapering tube and a reed unit in an example embodiment.

In FIG. 6A, an example embodiment is illustrated by a single air chamber and tapering tube in partial view. The air chambers 22 each have an inside arcuate wall 28 connecting the side walls 24. The arcuate wall 28 is opposite the harmonica reed unit 30 when the harmonica 10 is assembled. The tapering tube 42 and the air chamber walls 24 form a tapering annular tunnel 50 having a wide annular front side 50F and a narrow mouthpiece side 50M. Each tapering annular tunnel 50 has the reed unit 30 disposed diametrally within, the reed unit producing a clear, clean sweet note without phase cancellation from a note from another reed unit. The tunnels separate the sound waves produced in each chamber, thereby providing clear, sweet notes. The tunnels 50 enhance reverberation and minimize any phase cancellation of sound waves produced by different air chambers, providing cleaner, clearer notes. The notes in the high register are clean and sweet without shrill, squeaky noises often produced by an unskilled player.

Figure 6B:
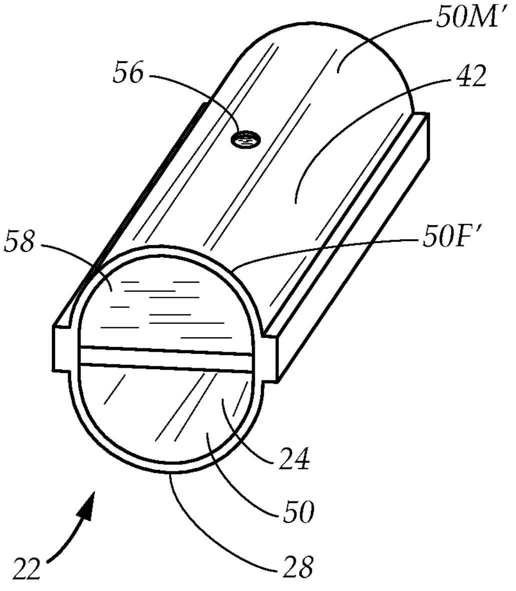
FIG. 6B is a partial view of the air chamber coupled to a tube and a reed unit in another example embodiment.

In another example embodiment, drawn in FIG. 6B, the front side 50F' of the tube 42 is sealed air tight by wall 58. In one example embodiment, the tube may be sealed air tight by a plug. The tunnel 50 has a mouthpiece side 50M' that is the same as the front side 50F' in cross-section. The tube has an opening 56 at its apex, operative for releasing air blown through the tube 42.

Figure 2:
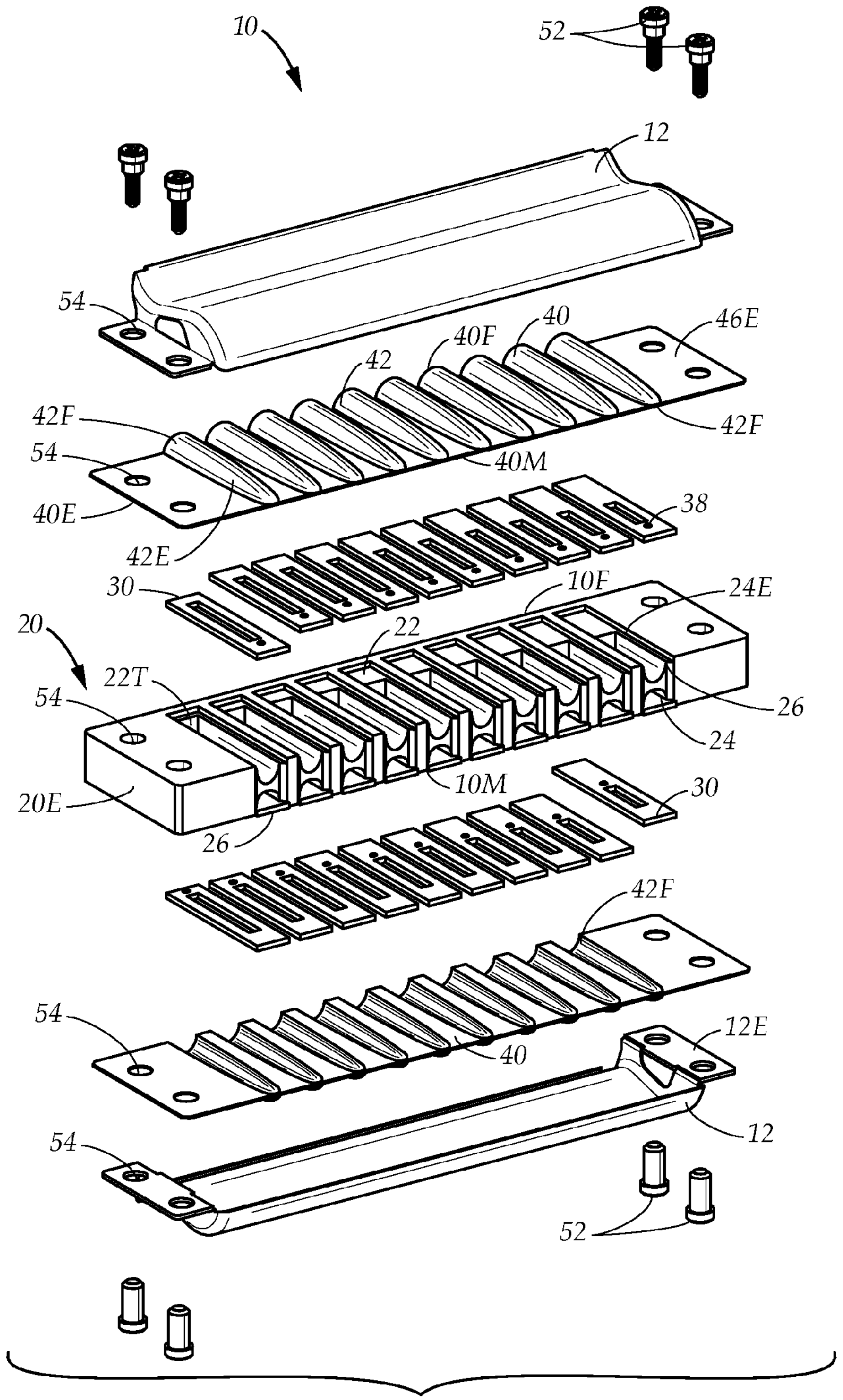
FIG. 2 is an exploded perspective view of another example embodiment of a harmonica of the present disclosure.

The novel harmonica 10 is shown in an exploded view as assembled in FIG. 2. Each cover plate 12 couples to each tube plate 40 and the comb 20 is between the tube plates 40, opposite the cover plates. The tubes 42 on the tube plate 40 are open towards the air chambers 22 of the comb 20 as described hereinabove. Each reed unit 30 inserts into each air chamber.

The tube plate 40 has a pair of ends 40E, the tube plate having a pair of final tubes 42F, a final tube adjacent to each end of the tube plate, the final tubes having with an outer edge 42E, one outer edge of each final tube at each end of the tube plate and the tube plate has a pair of planar extensions 46E, one extension on each side, each extensions extending from the edge 42 of the each final tube, the extensions operative for fixing the tube plate to the harmonica.

The extensions 46E each have at least one hole 54 operative for at least one fastener 52 fixing the tube plate to the harmonica.

Each cover plate 12 has a pair of opposing ends having a planar extension 12E, one extension on each end. The extensions each have at least one hole 54 operative for the at least one fastener 52 fixing the cover plate to the harmonica.

The harmonica comb 20 has a pair of terminal air chambers 22T having adjacent planar extensions 20E, the extensions each having at least one hole. The at least one hole 54 is operative for the at least one fastener 52 fixing the comb to the harmonica.

The harmonica 10 is further assembled by aligning the mouthpiece side 10M of the comb 20 with the mouthpiece side 40M of the tube plate 40 after the reed units are inserted in the comb 20. The holes 54 in the comb extension 20E are aligned with the holes 54 in the tube plate extension 46E. The holes 54 in the cover plate extensions 12E are aligned with the aligned holes 54 in the comb and tube plate. Fasteners 52 are inserted into the holes 54, securing the comb to the tube plates, the comb and tube plates between the cover plates.

Figure 3:
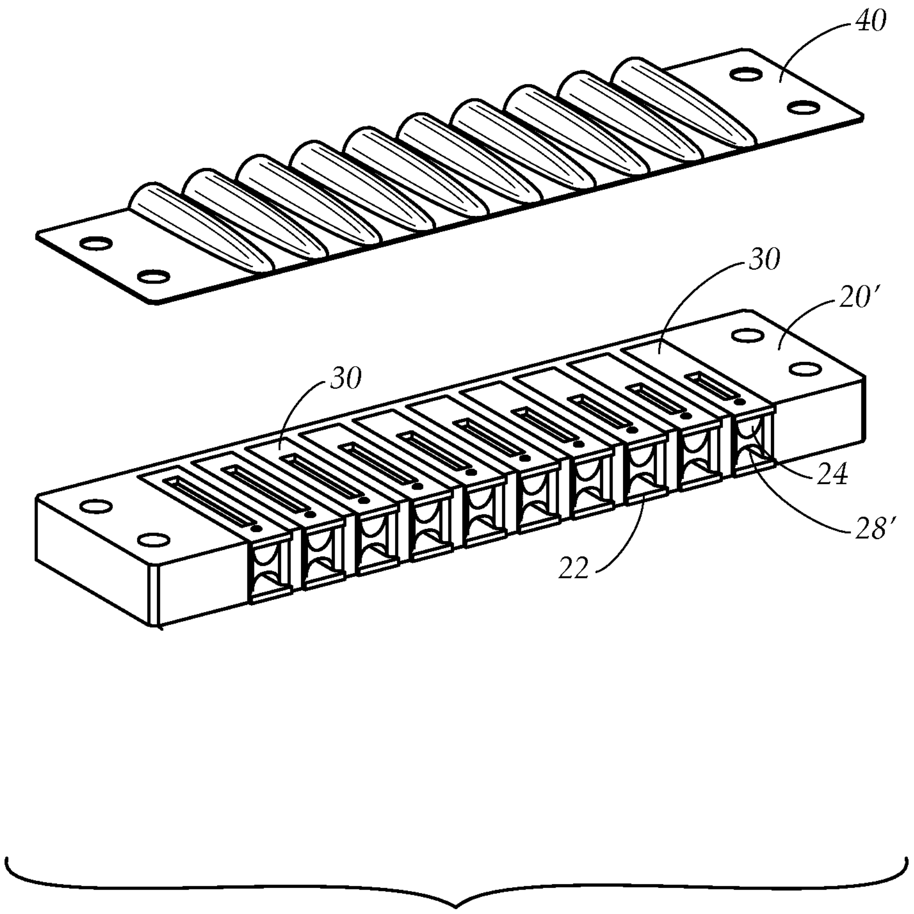
FIG. 3 is an exploded perspective view of an example embodiment of a step in a process of retrofitting a harmonica.

Referring to FIG. 3, the comb 20, the tube plate 40 and the reed units 30 are shown. In this embodiment, the air chambers 22 of comb have an orthogonal wall 28' between the side walls 24. This comb is well known to those of ordinary skill. Generally, a reed plate containing all of the reeds for the harmonica is coupled to the comb.

Reeds are pre-tuned to individual pitches. The standard diatonic harmonica is designed to be played in a single key. When one reed on a reed plate wears out, becoming off-pitch, harmonica in the prior art had to be disassembled and the entire reed plate replaced. Often a user had modified a reed on the plate to produced a unique tone. If another reed wears out, then the modified reed is lost in the replacement process.

However, this comb 20' is modifiable to accommodate the reed units 30 of the present disclosure. In the present disclosure, individual reed units are replaceable. Not only are worn out reed units replaceable, but the user can further modify the comb by placing reeds in a different order, thereby producing a harmonica capable of being played in a different key. The harmonica of the present disclosure is flexible in its tuning and its maintenance.

The tube plate 40 can be placed over the comb 20 within the cover plate, further modifying the harmonica and the harmonica can be reassembled.

Figure 5:
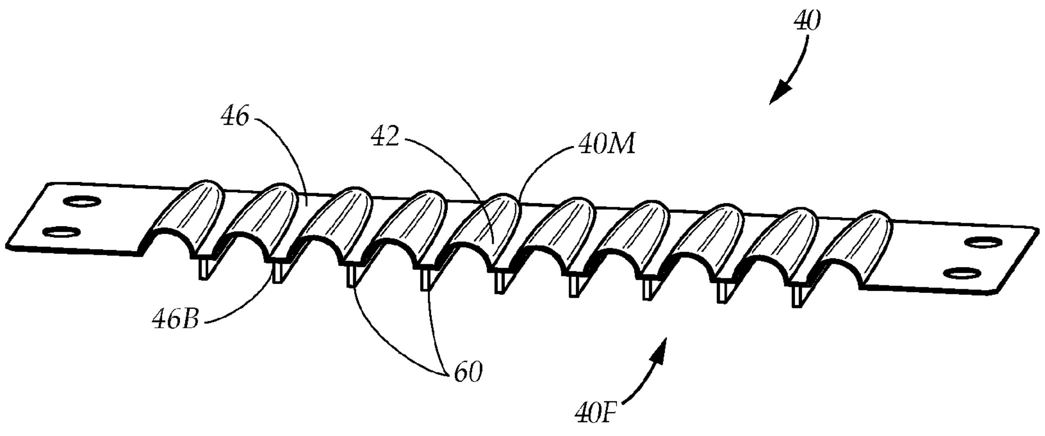
FIG. 5 is a perspective view of an embodiment of the tube plate for retrofitting a harmonica.

FIG. 5 shows the tube plate 40' for retrofitting harmonica. The tube plate 40" has a front side 40F and a mouthpiece side 40M, the tubes 42 and the plate 46 as described hereinabove. The plate 46 has a bottom side 46B having a plurality of supports 60 disposed thereon, the supports substantially equidistant between each tube 42. The supports are operative for fitting the tube plate onto a comb of the prior art.

Referring again to FIG. 2, a method of assembling the harmonica that produces clear, clean, sweet notes, comprises the steps of attaching a plurality of harmonica reed units 30 to a harmonica comb 20, the harmonica comb having a mouthpiece side 10M and a front side 10F, the harmonica comb having a plurality of air chambers 22, each air chamber having a pair of side walls 24 extending between the mouthpiece side 10M and the front side 10F, each side wall having an outside edge 24E. Each harmonica reed unit 30 has having a single reed as shown in FIG. 4A. Each reed unit has at least one fastener 38, the at least one fastener operative for attaching the harmonica reed unit 30 to a single air chamber 22 of the harmonica comb. The harmonica reed unit 30 inserting the side walls 24 of the air chamber 22, each harmonica reed unit discrete and separate.

In one example embodiment, the step of attaching a plurality of harmonica reed units 30 to a harmonica comb 20 includes the step of producing a notch 26 on the outside edge 24E of each side wall on each air chamber wall, 24 the harmonica reed 30 unit inserting between the notches 26 of the side walls of the air chamber 22.

The harmonica comb 20 is coupled between a pair of outer cover plates 12, the cover plates orthogonal to and between the mouthpiece side 10M and the front side 10F of the harmonica comb 20.

In one example embodiment, the step of coupling the harmonica comb 20 between the pair of outer cover plates 12 is preceded by the step of coupling the harmonica tube plate 40 in alignment with the harmonica comb, the tube plate having a mouthpiece side 40M and a front side 40F. The tube plate 40 has tubes 42 as described hereinabove. Each edge 42E of each tapering tube aligns with each side wall 24 of the air chamber 22 when the harmonica tube plate 40 is coupled to the harmonica comb 20.

In another example embodiment as shown in FIG. 6A, the step of attaching a plurality of harmonica reed units 30 to a harmonica comb includes forming an annular tunnel 50, the tunnel formed by the tube 42 of the tube plate and the air chamber 22, the air chamber 22 having a pair of side walls 24 connected by an inside arcuate wall 28. The harmonica reed unit 30 is disposed diametrically within the annular tunnel 50.

In one example embodiment of the method of assembling the harmonica, a harmonica as known in the prior art is disassembled and reassembled having the elements of the harmonica of the present disclosure providing a retrofitted harmonica. Referring to FIG. 2, the step of attaching a plurality of harmonica reed units 30 to a harmonica comb 20 is preceded by the step of dissembling a previously assembled conventional harmonica by removing the outer cover plates 12 and removing a pair of reed plates from the comb. In another example embodiment of the method, the step of attaching a plurality of harmonica reed units 30 to a harmonica comb 20 includes the step of producing a notch 26 on the outside edge 24E of each side wall on each air chamber wall, 24 the harmonica reed 30 unit inserting between the notches 26 of the side walls of the air chamber 22.

In a further example embodiment of the method, the step of attaching a plurality of harmonica reed units to a harmonica comb is replaced by the step of dissembling the conventional harmonica by removing the outer cover plates 12 is followed by the step of coupling the harmonica tube plate 40 in alignment with the harmonica comb 20, followed by the step of coupling the harmonica comb 20 between a pair of outer cover plates 12.

Figure 7:
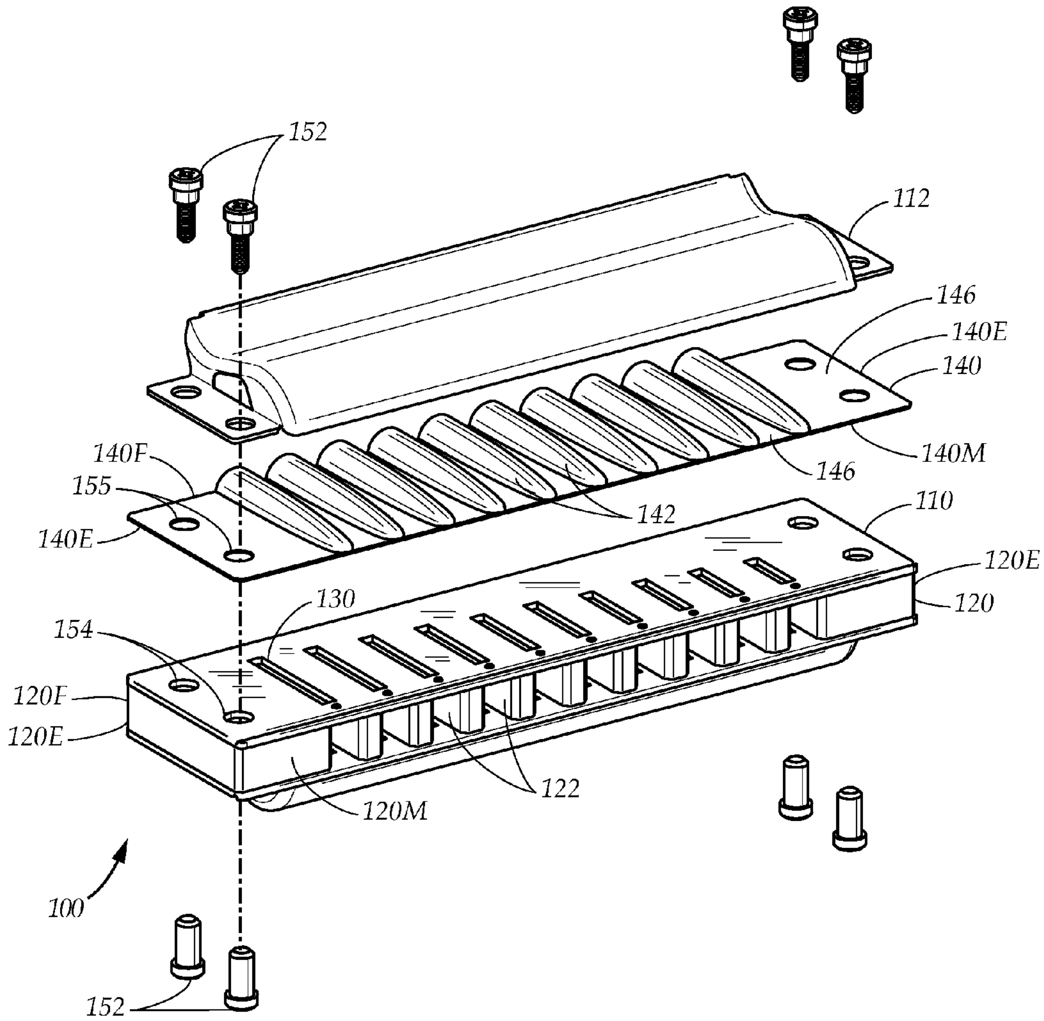
FIG. 7 is an exploded view, showing a harmonica having a conventional reed plate being modified according to the present disclosure.
Figure 8:
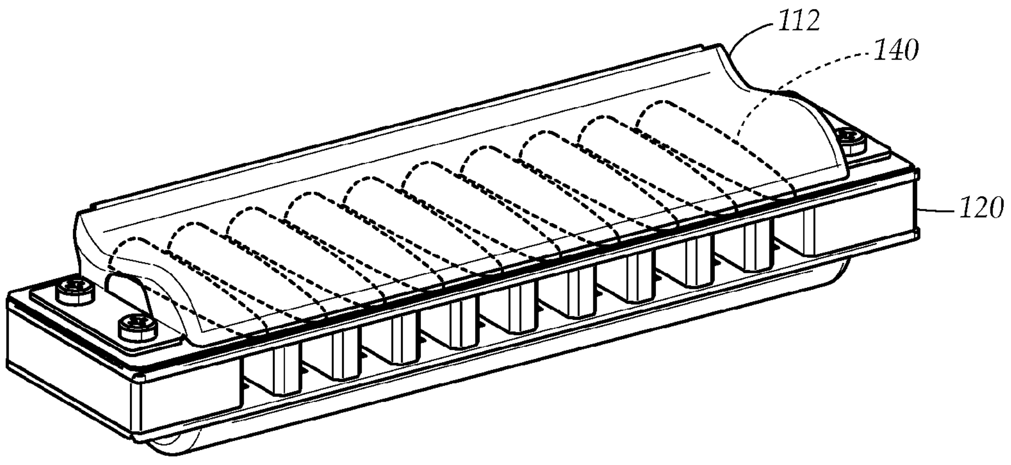
FIG. 8 is a diagrammatic perspective view, showing the harmonica of FIG. 7, reassembled.

FIG. 7 illustrates a conventional harmonica 100, having a conventional comb 120 and having a conventional reed plate 110 extending fully across the conventional comb. The comb 120 has a front 10F and a mouthpiece side 120M. The conventional reed plate 110 is a single piece, having a plurality of slots 130, each one having a reed attached therebeneath. In FIG. 7, this harmonica 100 is being retrofitted with a harmonica tube plate 140, substantially similar to the harmonica tube plate of FIGS. 1, 2, and 3. The tube plate 140 having a pair of ends 140E, a mouthpiece side 140M and a front 140F, a plurality of tubes 142 which extend substantially from the front 140F to mouthpiece side 140M, generally tapering toward the mouthpiece side 140M. The tube plate 140 also has a substantially planar plate 146 which extends between the tubes and at the ends 140E. The conventional harmonica has a cover plate 112, which is normally held onto the comb 120 with fasteners 152, that extend into holes 154 in the comb 140. Accordingly, to install the harmonica tube plate 140, the cover plate 112 is removed, by removing the fasteners 152. Then, the harmonica tube plate 140 is positioned between the reed plate 110 and cover plate 112, and the fasteners 152 are replaced. Preferably, the harmonica tube plate 140 is configured with plate holes 155 near its ends 140E that match holes 154 in the comb 120, such that the fasteners 152 simultaneously secure the cover 112 and the tube plate 140 to the comb 120, as shown in FIG. 8.

Figure 9:
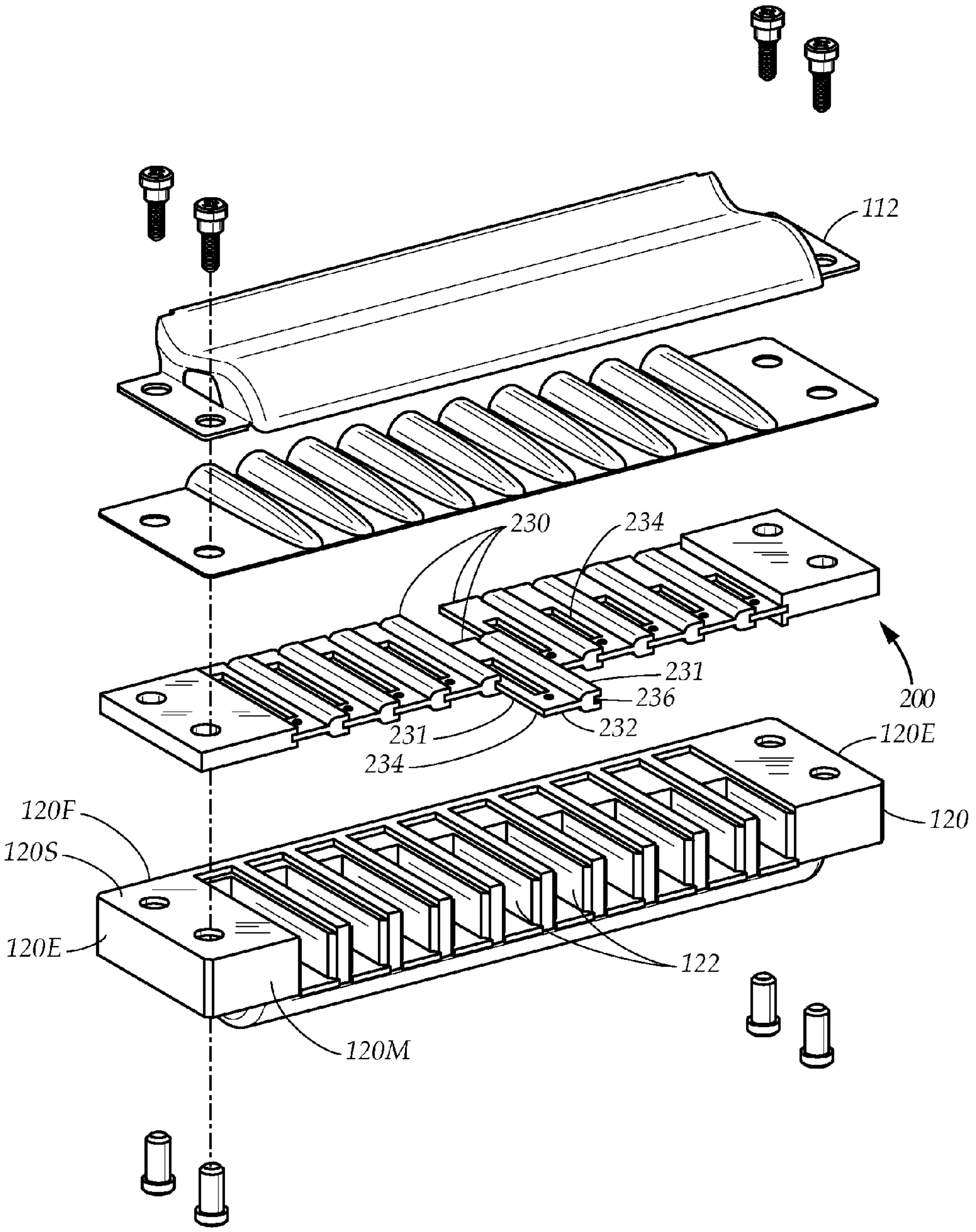
FIG. 9 is an exploded view, showing a further embodiment of the harmonica, wherein the conventional reed plate has been replaced by an arrangement of interlocking reed units.

FIG. 9 illustrates a further embodiment, wherein the cover plate 112 has been removed, and the conventional reed plate 110 of FIG. 7 has been replaced with a reed plate assembly 200, which comprises a plurality of individual reed units 230 which are linked together to form a contiguous plate that spans across the comb 120. The comb 120 has a top surface 120S (which may be functionally synonymous with its bottom surface for the sake of complementary harmonica structure where additional reed units and another cover plate are expectedly provided beneath the harmonica), a pair of ends 120E and a plurality of individual air chambers 122 between the ends, extending transversely between the mouthpiece side 120M and front 120F, and generally exposed at the top surface. In particular, each individual reed unit 230 has its own reed and is configured to span across a single air chamber 122, for sounding an individual note. In accordance with the principles of the present disclosure, the individual reed units 230 has a planar plate section 232 with an airway slot 234, and a pair of side edges 231. The reed units 230 also have a linking mechanism, for attaching the side edges 231 of adjacent reed units 230 to each other. In particular, linking mechanism may be a prong 234 and socket 236 arrangement in the example shown. According to such example, the reed unit 230 may be slightly thicker on one side to accommodate the socket 236. Alternatively, the linking mechanism may be a tongue and groove arrangement (in place of the prong and socket), where the planar plate section 232 of the reed unit 230 is of consistent thickness substantially between the side edges 231, and has a groove in one of the side edges 231, and is thinned down to create a tongue at the other of the side edges 231 which is sized to fit within the groove with an interference fit.

Figure 10:
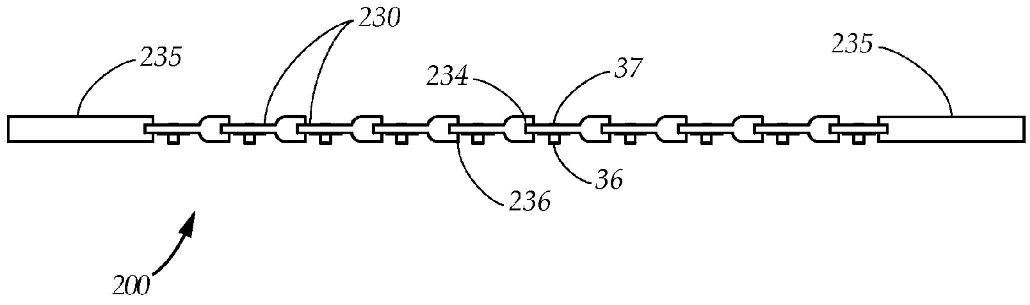
FIG. 10 is a front elevational view, showing the interlocking reed units, per se.

Referring to FIG. 10, the reed plate assembly 200 is shown as including a plurality of reed units 230, as well as end units 235 which do not have a reed associated with them but which facilitate securing the reed units 230 to the comb. Once again, according to this exampletive manner of attaching the side edges 231 of adjacent reed units 230—with the exception perhaps of reed units adjacent to the end units 235, each reed unit has a socket 236, and a prong 234. Also shown, is the reed 36 and connector 37.

Figure 11:
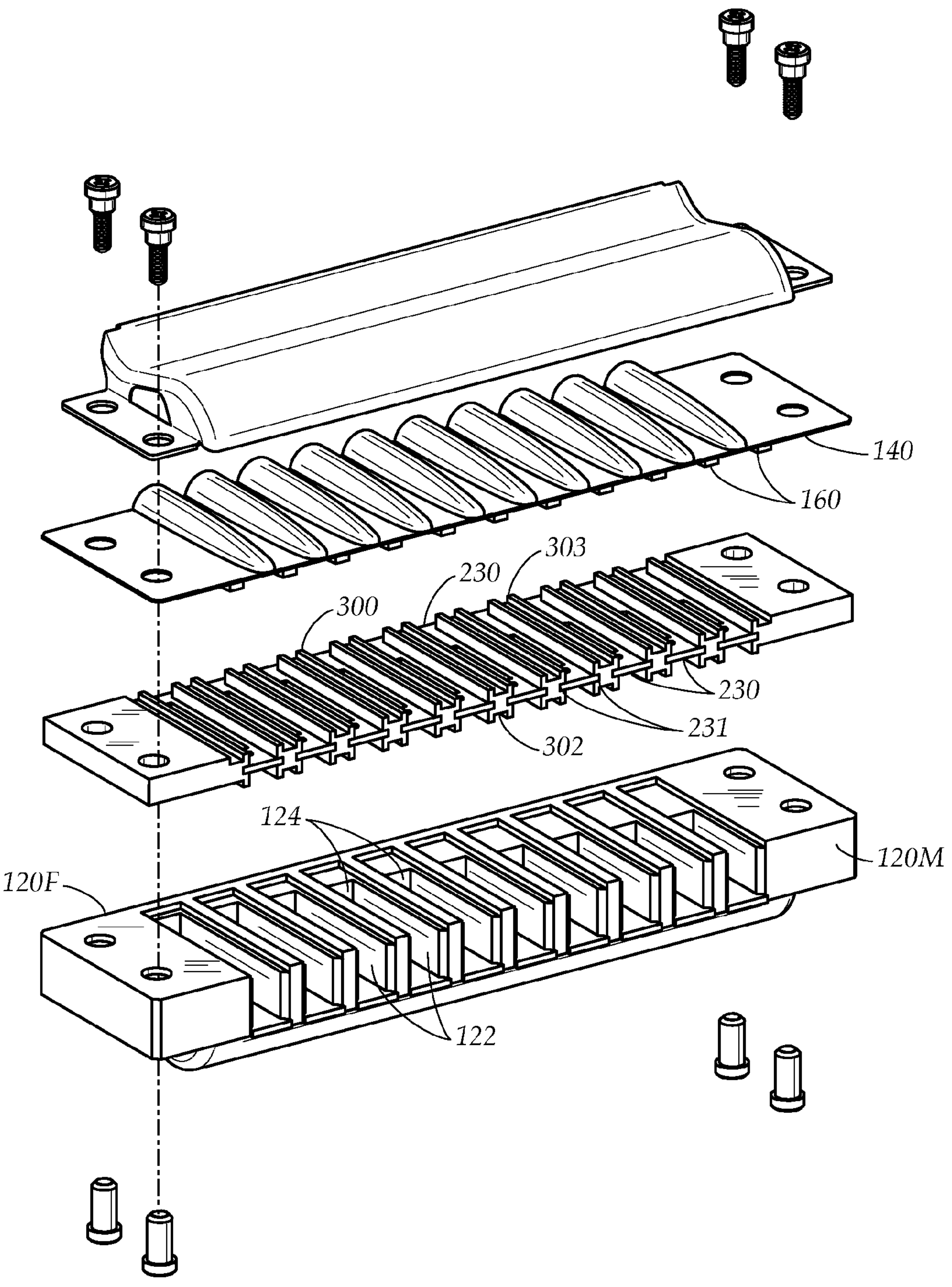
FIG. 11 is an exploded view, showing yet a further embodiment of the interlocking reed units.
Figure 12:
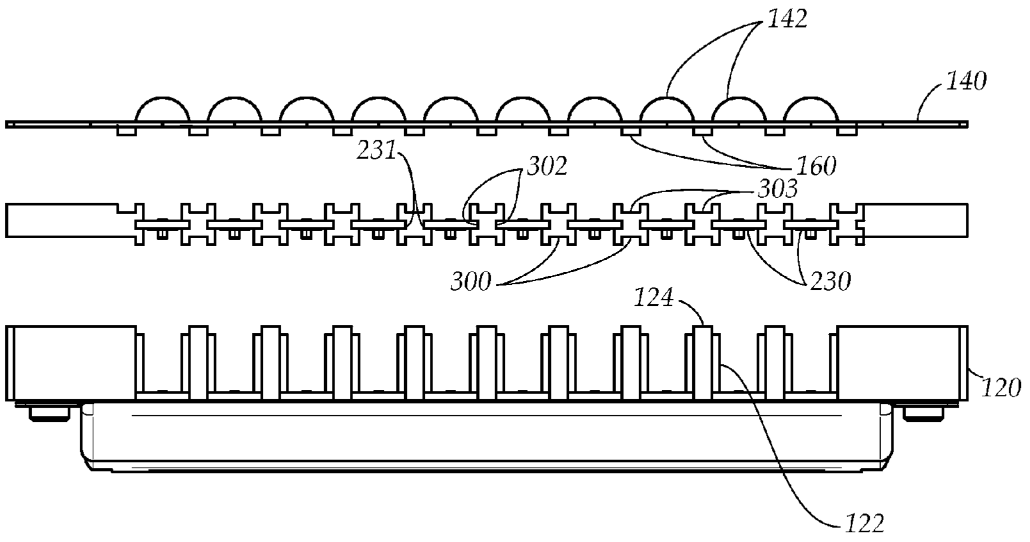
FIG. 12 is a front elevational view, showing components of the harmonica having the further embodiment of interlocking reed units.

FIG. 11 shows a further example that facilitates individual reed units 230, by providing a connector 300. Referring to FIG. 12, each connector 300 has a pair of side ports 302, which are sized to fit the side edges 231 of the reed units 230. The side ports 302 are substantially one hundred eighty degrees apart, and extend longitudinally along the connectors 300. The comb 120 as shown in FIGS. 11 and 12 has a front side 120F, a mouthpiece side 120M, a plurality of air chambers 122, and side walls 124 which extend vertically between and define the air chambers 122. The connectors 300 are each sized to extend substantially between the mouthpiece side 120M and front side 120F of the comb 120. The connectors 300 may also have a lower port 302, which can be sized to fit over the side walls 124 and secure thereto. Accordingly, each reed unit 230 is 'book-ended' by a pair of adjacent connectors 300 which secure to the side edges 231 of said reed unit 230, and secures to the side walls 124 that define one of the air chambers 122, thereby securing and positioning said reed unit directly over said air chamber 122.

When used in conjunction with the tube plate 140, the connector 300 may be configured to secure directly thereto. Referring to FIGS. 11 and 12, the tube plate 140 may having a plurality of supports 160 extending from the plate 146 between the tubes. Each connector 300 may then have an upper port 303, which secures to one of the supports 160. Thus, each connector 300 can be configured to make a four way connection—between adjacent reed units 230, the tube plate 140, and to the comb 120 by securing to one of the side walls 124 of one of the air chambers 122. In addition, by using the connector, any of the individual reed units 230 may be easily removed, to replace the reed associated therewith—without requiring that all of the reeds or an entire reed plate be replaced. In addition, the connector 300 effectively positions and holds one of the reed units and one of the tubes 142 of the tube plate 140 directly over one of the air chambers 122.

It is understood that when an element is referred hereinabove as being "on" another element, it can be directly on the other element or intervening elements may be present therebetween. In contrast, when an element is referred to as being "directly on" another element, there are no intervening elements present.

Moreover, any components can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a modifiable harmonica and technology for retrofitting harmonica. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method of retrofitting a harmonica having a comb having a mouthpiece side and having an opposing front side, a reed plate mounted onto the comb, a cover plate secured to the comb with a plurality of fasteners, the comb having a plurality of individual air chambers, each extending substantially between the mouthpiece side and the front side, using a tube plate having a mouthpiece side and an opposing front side, the tube plate having a pair of opposing ends and includes a plate portion that is substantially planar at the opposing ends, the tube plate having a plurality of tubes extending between the mouthpiece side and the front side of the tube plate and tapered toward the mouthpiece side of the tube plate and the plurality of tubes are closed at the mouthpiece side of the tube plate, comprising the steps of:

removing the cover plate from the comb by un-securing the plurality of fasteners;

positioning the tube plate against the reed plate and over the comb with the front side of the tube plate aligned with the front side of the comb, wherein each of the plurality of tubes is aligned with one of the plurality of individual air chambers; and securing the tube plate against the comb by trapping the tube plate between the comb and the cover plate by re-securing the cover plate to the comb using the plurality of fasteners.

2. The method of retrofitting a harmonica as recited in claim 1, wherein the reed plate has a plurality of reed units arranged in a contiguous plate, each of the plurality of reed units for sounding an individual note and positioned over one of the plurality of individual air chambers in the comb; and wherein the step of positioning the tube plate against the reed plate further comprises aligning each of the plurality of tubes with one of the plurality of reed units.

3. The method of retrofitting a harmonica as recited in claim 2, wherein the tube plate is substantially planar between each adjacent pair of the plurality of tubes.

4. The method of retrofitting a harmonica as recited in claim 3, wherein each of the comb and the cover plate has a plurality of holes; wherein each of the plurality of fasteners securing the cover plate to the comb extends through a respective one of the plurality of holes in each of the cover plate and the comb; wherein each of the opposing ends of the tube plate has a plurality of holes; wherein the step of positioning the tube plate against the reed plate and over the comb further comprises aligning the plurality of holes in the tube plate with the plurality of holes in the comb; and wherein the step of securing the tube plate against the comb further comprises extending the fasteners through the plurality of holes in the cover plate, the plurality of holes in the tube plate, and the plurality of holes in the comb.

5. The method of retrofitting a harmonica as recited in claim 1, wherein the reed plate is a conventional reed plate.

* * * * *